E. MEITNER.
SHOCK ABSORBING TRANSMISSION MECHANISM.
APPLICATION FILED SEPT. 14, 1918.
1,391,653.
Patented Sept. 20, 1921.
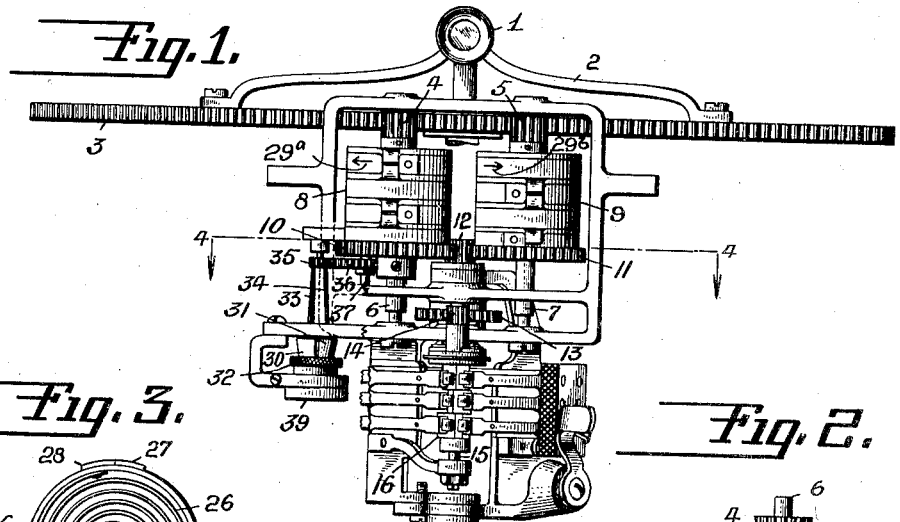
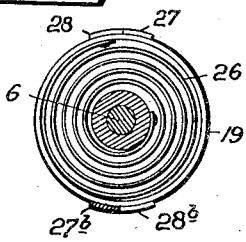
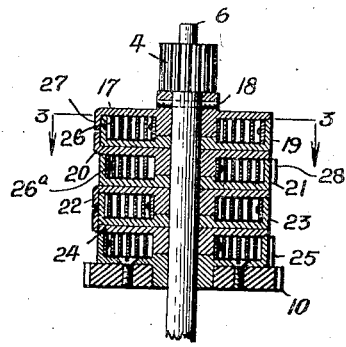
INVENTOR
ELEMER MEITNER
BY Herbert H. Thompson
his ATTORNEY

UNITED STATES PATENT OFFICE.

ELEMER MEITNER, OF NEW YORK, N. Y., ASSIGNOR TO THE SPERRY GYROSCOPE COMPANY, OF BROOKLYN, NEW YORK, A CORPORATION OF NEW YORK.

SHOCK-ABSORBING TRANSMISSION MECHANISM.

1,391,653.   Specification of Letters Patent.   Patented Sept. 20, 1921.

Application filed September 14, 1918. Serial No. 254,157.

*To all whom it may concern:*

Be it known that I, ELEMER MEITNER, a subject of the King of Hungary, residing at New York, in the county of New York and State of New York, have invented certain new and useful Improvements in Shock-Absorbing Transmission Mechanism, of which the following is a specification.

This invention relates to transmission mechanism of the step-by-step or impulse systems.

In electrical impulse or step-by-step transmission systems there is always danger when the speed of the transmitter exceeds a critical value, of the receiver dropping out of step. This dropping out of step will also take place when too sudden a change of speed of the transmitter takes place.

The object of this invention is to provide means for preventing excessive speed of the transmitter as well as sudden changes in the speed thereof.

Referring to the drawings wherein I have shown what I now consider to be the preferred form of my invention:

Figure 1. is a front elevation of the transmission mechanism showing the embodiment of my invention.

Fig. 2. is a sectional side view of one of the shock absorbing devices.

Fig. 3. is a sectional plan view thereof taken on line 3—3, Fig. 2.

Fig. 4. is a detail taken on line 4—4 of Fig. 1, showing the gear connections between the shock absorbing elements, the transmitter and the speed limiting means.

Fig. 5. is a wiring diagram.

Fig. 6. is virtually a diagrammatic view of the shock absorbing device shown in Fig. 2, the parts thereof being spread apart to show their relationship.

While it is obvious that my invention may be widely applied, I have shown it here in connection with a telescope at the transmitting end and a pointer at the receiving end for indicating the azimuth movements and direction of pointing of the telescope.

In the drawings the telescope is shown at 1, mounted by means of brackets 2 on a large gear 3. While the telescope may be permitted to tilt in a vertical plane without affecting the gear 3, it is rigidly secured to said gear laterally, so that turning of the telescope in a lateral plane will effect the rotation of the gear.

Said gear 3 is shown meshing with pinions 4 and 5 rigidly mounted on shafts 6 and 7. Shock absorbing devices 8 and 9 are also shown mounted on shafts 6 and 7, terminating in gears 10 and 11. Gears 10 and 11 mesh with a pinion 12 fixed on the same shaft with a gear 13 which in turn meshes with pinion 14 on shaft 15 on which shaft are also mounted the cams 16 of the transmitter.

The shock absorbing device is shown as comprising a member 17 fixed by a pin 18 to shaft 6; a plurality of members 19, 20, 21, 22, 23, 24, and 25 loosely mounted on said shaft and springs 26 and lugs or stops 27—28 successively connecting said members. The operation of the shock absorbing element is as follows:

The rotation of pinion 4 in the direction indicated by arrow 29 causes member 17 to rotate in the same direction. Spring 26 between members 17 and 19 is adapted to hold member 19 under tension so that the stop 28 thereon presses against stop 27 on member 17. It will thus be seen then that member 19 will follow the rotation of member 17. Member 19 will in turn drag member 20 with it by reason of the overlapping of the stop 27$^a$ on member 20 by stop 28 on said member 19. Spring 26$^a$ between members 20 and 21 holding stop 28$^b$ against 27$^b$ will in turn cause member 21 to follow member 20. Thus the rotation will be transmitted through all of the members to member 25 which may be rigidly attached to gear 10 to cause the latter to rotate also.

It will be readily understood now that, as long as pinion 4 rotates smoothly, gear 10 will follow at the same speed as if it were rigidly connected to said pinion. When pinion 4 starts with a sudden jerk, however, or when a sudden change of its speed takes place, the shock will be absorbed by one or all of the springs 26 successively and will not reach gear 10. In other words, spring 26 will yield and member 17 will jump ahead of member 19, while member 19 gathers speed smoothly and soon overtakes member 17; stop 28 again resting against stop 27.

When pinion 4 rotates in the direction opposite to that indicated by arrow 29, member 17 will of course follow and carry with it member 19 by virtue of the overlapping of stops 27 and 28. It is obvious, however, that stop 28 will move away from stop 27$^a$ and thus be free to turn nearly a complete revolution without turning member 20.

The operative direction of rotation of device 8 is indicated by arrow 29ª, while that of device 9 is in the opposite direction as indicated by arrow 29ᵇ, so that when pinions 4 and 5 are rotated by gear 3, motion will be transmitted to pinion 12 through only one of said devices since separation of stops 28 and 27ª will tend to take place in the backwardly rotating device. Obviously, however, the connection between pinion 12 and gears 10 and 11 will cause stop 27ª to follow stop 28 of said backwardly rotating device: the said stops being thus held normally together. But when a sudden change in speed takes place so that springs 26 of the working device yield, stop 28 of the non-working device will move ahead of stop 27ª.

As previously pointed out I desire also to provide means for limiting the speed of the transmitter, for although the acceleration be gradual the speed may become such that the load upon the repeater motor may not yield readily enough to avoid throwing the system out of step. Also, if the repeater system gathers too much speed, there is danger of its own momentum throwing it out of step if the transmitter suddenly stops. For this purpose I may employ a speed governing brake which will automatically become operative with increasing effect as the speed increases beyond a predetermined rate.

This brake may assume the form of an inverted split frustum, the two parts being represented at 30 and 31. The said parts are shown within a collar like member 32, and are connected by resilient arms 33 and 34 to a pinion 35. Said pinion 35 meshes with a gear 36 fixed on the same shaft 37 with pinion 38 which in turn meshes with gear 10. The turning of gear 10 then, causes the parts 30 and 31 to rotate within collar 32. The centrifugal force of the rotating parts causes them to spread until they touch the inside of said collar. When the speed of gear 10 reaches a predetermined value, the parts 30 and 31 are designed to press so firmly against the collar as to prevent a further increase of speed. Springs 26 will then yield as before, and bring gear 10 up to its proper position as soon as the speed of the driving gear 3 is again reduced below the critical point.

The critical speed may be adjusted by raising or lowering collar 32 within its supporting frame 39.

The manner in which the transmitter controls the receiver is shown in the wiring diagram in Fig. 5, in which the cams 16 are shown as actuating a plurality of contacts 40 to successively energize the field coils 41 of the repeater motors 42, which actuate the pointer or suitable repeater 43. The operation of these parts is well known, and since they do not form any part of this invention, a description of them will be omitted here.

From the foregoing description it will be seen that as the operator looking through the telescope 1, moves said telescope to pick up or follow the target, the pointer 43 will follow said movements, and indicate the bearing of the target as long as the operator views the latter through the telescope. But when the operator moves the telescope too rapidly or suddenly, the pointer will fall slightly behind for the moment, coming into place as soon as the telescope slows down or comes to rest upon the target.

It will be seen from the construction described that the sighting instrument 1 can be turned at such speed that gear 4 and member 17 may become several revolutions ahead of gear 10, since practically 360° play is permitted between the elements of each pair of members 17 and 19, 20 and 21, 22 and 23, etc. At the same time, due to springs 26, 26ª, etc., in coöperation with the speed limiting brake, gear 10 will be caused to follow up the movements of the sighting instrument in the minimum of time consistent with the keeping in step of the repeater motors and transmitter. Consequently the speed at which the sighting instrument may be turned without loss of synchronism between the transmitter and repeaters is considerably increased.

In accordance with the provisions of the patent statutes, I have herein described the principle of operation of my invention, together with the apparatus, which I now consider to represent the best embodiment thereof, but I desire to have it understood that the apparatus shown is only illustrative, and that the invention can be carried out by other means. Also, while it is designed to use the various features and elements in the combination and relations described, some of these may be altered and others omitted without interfering with the more general results outlined, and the invention extends to such use.

Having described my invention, what I desire to secure by Letters Patent is:

1. In a shock absorbing device, a driving part, a movable member having a projection thereon, resilient means connecting said member and part for moving said member in response to movement of said part in one direction, a second movable member, a stop thereon normally engaged by said projection, a driven part, and means connecting said driven part and said second movable member.

2. In a shock absorbing device, a driving part, a driven part, a plurality of movable members, one of said members being connected to said driving part and another to said driven part, resilient means interconnecting certain of said members tending to rotate the same relatively, means for limiting the extent of said relative rotation, and co-acting stops between others of said members for limiting the relative rotation thereof.

3. In an impulse transmitter, a rotatable part, a plurality of shock absorbing devices actuated thereby, said devices comprising a plurality of rotatable members, resilient connections between certain of said members, and co-acting stops between others thereof, a transmitter of electrical impulses connected to said devices, one of said devices being adapted to actuate said transmitter in one direction and another of said devices being adapted to actuate said transmitter in another direction.

4. In an impulse transmitter, a rotatable part, a plurality of shock absorbing devices actuated thereby, said devices comprising a plurality of rotatable members having resilient connections between some thereof and co-acting stops between others thereof, a transmitter of electrical impulses connected to said devices, one of said devices being adapted to actuate said transmitter in one direction and another of said devices being adapted to actuate said transmitter in another direction, and means for limiting the speed of said transmitter.

5. In a transmission device, a rotatable part, a plurality of rotatable members driven thereby, a plurality of resiliently interconnected stop elements associated with one of said members, a plurality of resiliently interconnected stop elements associated with another of said members, and a driven part connected with said members, one of said members being adapted to actuate said driven part in one direction and another of said members being adapted to actuate said driven part in another direction.

6. In a transmission device, a rotatable part, a plurality of shock absorbing devices actuated thereby, each of said devices comprising a rotatable part and a plurality of resiliently interconnected stop elements associated therewith, and a transmitter of electrical impulses connected to said devices, one of said devices being adapted to actuate said transmitter in one direction and another of said devices being adapted to actuate said transmitter in another direction.

7. In a shock absorbing device, a driving part, a movable member resiliently connected thereto, a projection on said member, a second movable member having a stop adapted to be engaged by said projection on movement of said projection in one direction, a stop connected with said driving part and adapted to be engaged by said projection to limit the movement thereof in the same direction, a driven part, and a connection between said second movable member and said driven part.

8. In a transmission device, a rotatable driving part, a transmitter of electrical impulses adapted to be rotated thereby, a rotatable member connected with said driving part to be rotated therefrom, and yielding connecting means between said member and said transmitter for permitting said member to become more than one revolution ahead of the transmitter.

9. In a transmission device, a rotatable driving part, a transmitter of electrical impulses, and yielding connecting means between said driving part and said transmitter for permitting the transmitter to lag more than one revolution behind said driving part.

10. In a transmission device, a plurality of sets of shock absorbing units, the units of each set being movable through at least 180 degrees with relation to each other, co-acting stops between said units, means for actuating one of said units, and means adapted to be actuated by another of said units.

11. In a transmission device, a driving part, a driven part, and connecting means between said parts comprising a plurality of stop elements resiliently interconnected and movable through at least one-half a revolution with relation to each other.

12. In a shock absorbing device, a movable element having a stop connected therewith, a movable member having a projection, resilient connecting means between said element and said member for biasing said projection into engagement with said stop, a second movable member, a stop on said second movable member adapted to be engaged by said projection, a transmitter of electrical impulses and a connection between said second movable member and said transmitter.

13. In combination with a transmitter of electrical impulses, a driving part, a stop movable by said part, a movable member having a projection, resilient means for biasing said projection into engagement with said stop, a second movable member, a stop on said second movable member adapted to be engaged by said projection, a connection between said second movable member and said transmitter, and means for limiting the speed of said transmitter.

14. In combination with a transmitter of electrical impulses, a driving part, a plurality of movable members, one of said members being connected to said driving part and another to said transmitter, resilient means interconnecting certain of said members, and coacting stops between others of said members.

15. In combination with a transmitter of electrical impulses, a driving part, a plurality of movable members, one of said members being connected to said driving part and another to said transmitter, resilient means interconnecting certain of said members tending to rotate the same relatively, means for limiting the extent of said relative rotation, and co-acting stops between others of said members for limiting the relative rotation thereof.

16. In combination, an electrical impulse transmitter, and driving means for said transmitter comprising a plurality of stop elements resiliently interconnected and movable through at least 180 degrees with relation to each other.

In testimony whereof I have affixed my signature.

ELEMER MEITNER.